(12) United States Patent
Murray et al.

(10) Patent No.: US 12,103,767 B1
(45) Date of Patent: Oct. 1, 2024

(54) WHEELED GARBAGE RECEPTACLE WITH BUILT IN SEAT

(71) Applicants: Jeffrey Murray, Lauderdale Lakes, FL (US); Prischell Griffin, Lauderdale Lakes, FL (US)

(72) Inventors: Jeffrey Murray, Lauderdale Lakes, FL (US); Prischell Griffin, Lauderdale Lakes, FL (US)

(*) Notice: Subject to any disclaimer, the term of this patent is extended or adjusted under 35 U.S.C. 154(b) by 799 days.

(21) Appl. No.: 17/330,535

(22) Filed: May 26, 2021

(51) Int. Cl.
| | | |
|---|---|---|
| *B65F 1/14* | (2006.01) | |
| *B60N 2/30* | (2006.01) | |
| *B65F 1/16* | (2006.01) | |

(52) U.S. Cl.
CPC .......... *B65F 1/1473* (2013.01); *B60N 2/3006* (2013.01); *B60N 2/3097* (2013.01); *B65F 1/1615* (2013.01)

(58) Field of Classification Search
CPC ........ B65F 1/00; B65F 1/1473; B65F 1/1468; B65F 1/1615; B65F 1/16; B65F 1/14; B65F 2230/144; B65F 2220/108; B60N 2/3006; B60N 2/3097; B60N 2/24; B60N 2/30; B60N 2/3002; B60N 2/3004; B60N 2/3013

See application file for complete search history.

(56) References Cited

U.S. PATENT DOCUMENTS

| | | | |
|---|---|---|---|
| 2,526,767 A | 10/1950 | Parker | |
| 2,628,146 A * | 2/1953 | De Rennaux | .......... A47C 7/626 |
| | | | 297/188.1 |
| 3,514,007 A * | 5/1970 | Woods, Sr. | ........... B65F 1/1468 |
| | | | 220/264 |
| 4,313,612 A * | 2/1982 | Rubens | ...................... B62B 3/04 |
| | | | 280/47.35 |
| 4,387,927 A | 6/1983 | Fahey | |
| 4,773,709 A * | 9/1988 | Slinkard | ................. B63B 29/04 |
| | | | 297/188.09 |
| 5,100,198 A * | 3/1992 | Baltzell | ..................... A47C 7/74 |
| | | | 280/47.38 |
| 5,435,643 A * | 7/1995 | Kennedy | .............. A47B 83/045 |
| | | | 297/188.13 |
| 5,839,738 A * | 11/1998 | Ozark | ..................... A45C 11/20 |
| | | | 280/30 |
| 7,066,476 B2 * | 6/2006 | Elden | ........................ B62B 1/12 |
| | | | 280/37 |

(Continued)

*Primary Examiner* — James M Dolak
(74) *Attorney, Agent, or Firm* — Sanchelima & Associates, P.A.; Christian Sanchelima; Jesus Sanchelima

(57) ABSTRACT

A wheeled garbage receptacle with built-in seat including a main receptacle assembly, an add-on receptacle assembly, and a seat assembly is disclosed. These assemblies in conjunction with one another provide a simple solution to maintaining comfortability while disposing of refuse. The main receptacle assembly includes a hollow cylindrical body that can be placed in alignment with an add-on receptacle. The main receptacle engaging with the add-on receptacle via latches about the perimeter of said main receptacle body. The main receptacle assembly also includes a seat assembly that forms a portion of the cylindrical body when in a closed position. The seat assembly includes a seat portion and a back rest that is mounted via a hinge. The add-on receptacle assembly includes a hollow container with a door. Said door allowing a user access to the interior of the add-on receptacle.

15 Claims, 6 Drawing Sheets

(56) References Cited

U.S. PATENT DOCUMENTS

| | | | |
|---|---|---|---|
| 7,866,679 B1 * | 1/2011 | Leon .................... | B65F 1/1426 |
| | | | 280/79.5 |
| 11,103,073 B1 * | 8/2021 | Hertlein ................ | B65D 51/24 |
| 11,649,110 B2 * | 5/2023 | Lee ...................... | G01F 23/284 |
| | | | 701/23 |
| 2002/0063132 A1 * | 5/2002 | Prins .................... | B65F 1/1426 |
| | | | 220/495.01 |

* cited by examiner

WHEELED GARBAGE RECEPTACLE WITH BUILT IN SEAT

BACKGROUND OF THE INVENTION

1. Field of the Invention

The present invention relates to a wheeled garbage receptacle with a built-in seat and, more particularly, to a wheeled garbage receptacle with a built-in seat that is modular.

2. Description of the Related Art

Several designs for a wheeled garbage receptacle with a built-in seat have been designed in the past. None of them, however, include a hinged cover in the side wall that reveals a seat assembly.

Applicant believes that a related reference corresponds to U.S. Pat. No. 4,387,927 issued for a chair that is made from a 30-gallon steel garbage can. Applicant believes another related reference corresponds to U.S. Pat. No. 2,526,767 issued for a combination kitchen stool and waste receptacle. None of these references, however, teach of a wheeled garbage receptacle with a built-in seat that includes a coupling to connect multiple receptacles together.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a wheeled garbage receptacle with a built-in seat that includes a hinged cover in the side wall that reveals a seat assembly.

It is another object of this invention to provide a wheeled garbage receptacle with a built-in seat that includes a coupling to attach multiple receptacles.

It is still another object of the present invention to provide a wheeled garbage receptacle with a built-in seat that includes a handle that also functions as a stand for the receptacle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
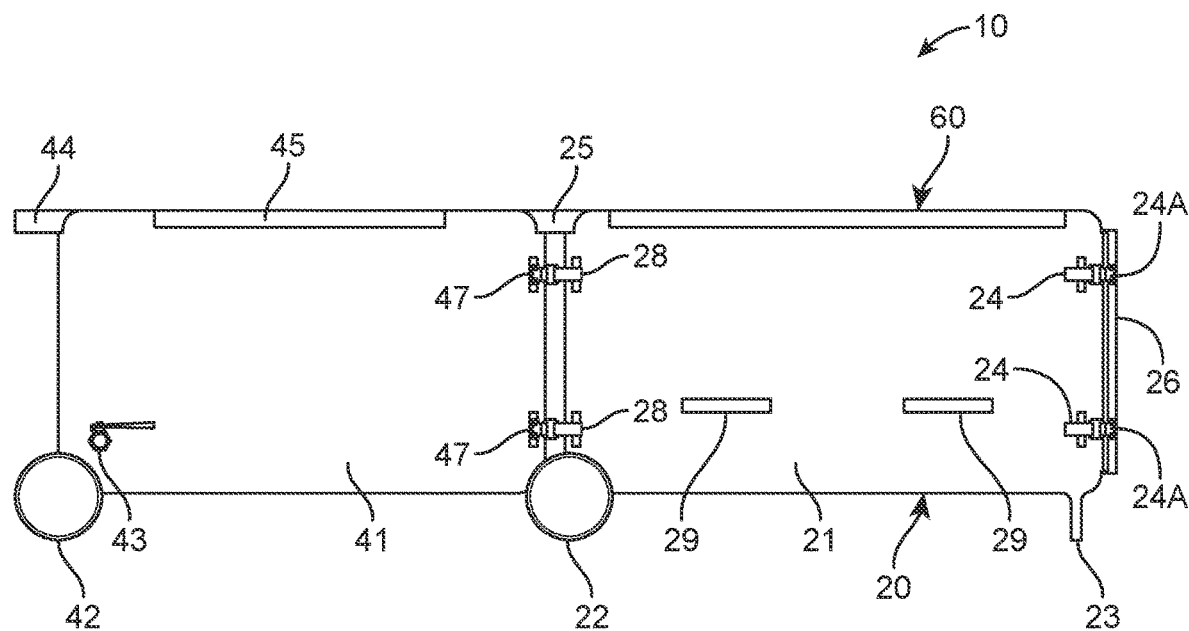
FIG. 1 represents a side view of the main receptacle assembly 20 engaged with the add-on receptacle assembly 40 via bottom lid latch 28 and add-on latch hook 47.

Referring now to the drawings, where the present invention is generally referred to with numeral 10, it can be observed that it basically includes a main receptacle assembly 20, an add-on receptacle assembly 40, a seat assembly 60.

Figure 2:
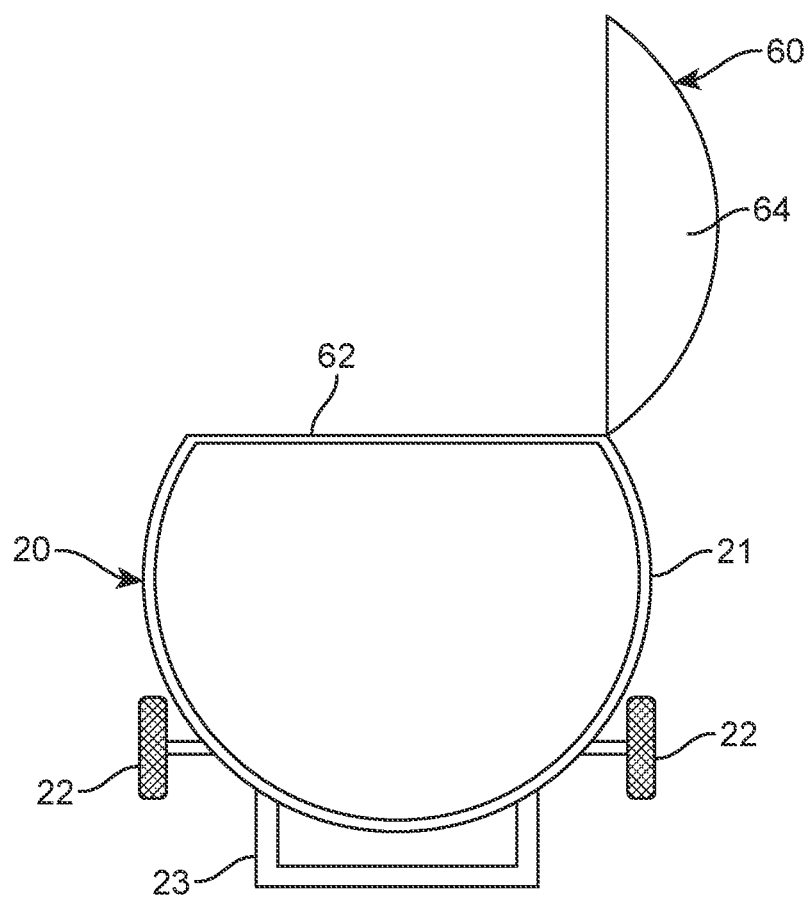
FIG. 2 shows an internal view of main receptacle 21 with seat assembly 60 in an open configuration.
Figure 5:
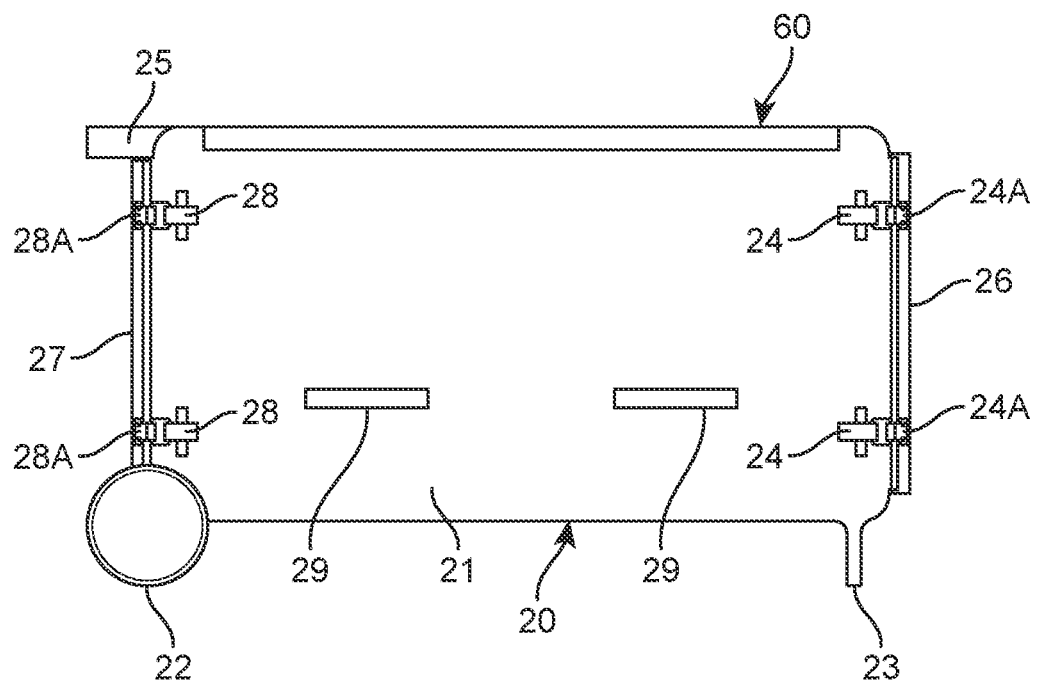
FIG. 5 depicts main receptacle assembly 20 disengaged from receptacle assembly 20 including top lid 26 and bottom lid 27 mounted on both ends thereon.
Figure 6:
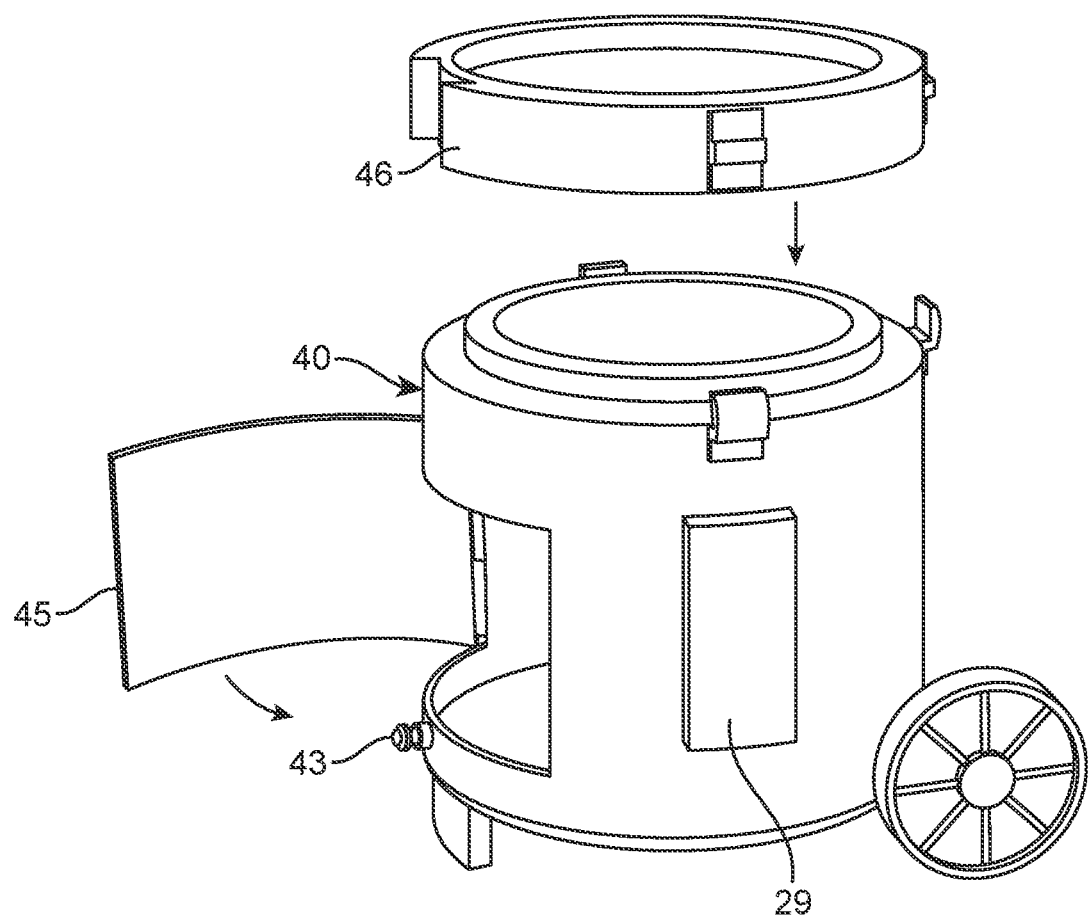
FIG. 6 demonstrates an embodiment of add-on receptacle 41 in an upright isometric view including compartments 29.
Figure 7:
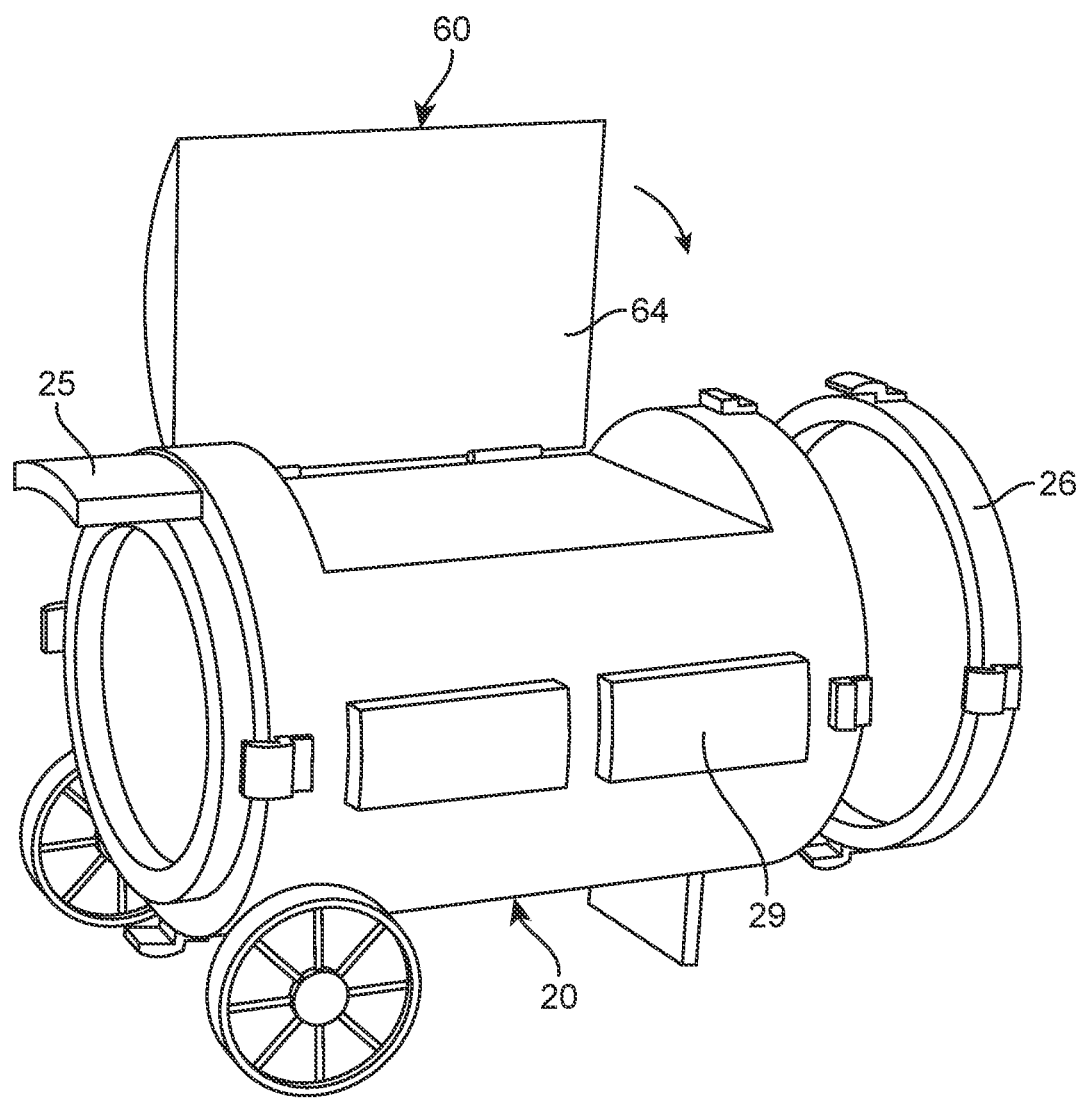
FIG. 7 shows an isometric view of main receptacle assembly 20 with seat assembly 60 in an open configuration.

Best shown in FIGS. 2 and 5 main receptacle assembly 20 may include a main receptacle 21. In one embodiment main receptacle 21 may be a cylindrical body including a first end and a second end. Wherein the cylindrical body is hollow. Said first end and second end including an opening to the interior of main receptacle 21. Externally mounted to main receptacle 21 about the perimeter of the first end and second end may be a top lid latch 24 and a bottom lid latch 28, respectively. In one embodiment top lid latch 24 and bottom lid latch 28 may both be pull down latches. It may be preferable to include a multitude of top lid latch 24 and bottom lid latch 28 disposed about their respective first end and second end. It may be suitable for top lid latch 24 to engage with top lid latch hook 24A. Top lid latch hook 24A may be mounted about a perimeter edge of top lid 26. It may also be suitable for bottom lid latch 28 to engage with bottom lid latch hook 28A. Bottom lid latch hook 28A may also be mounted about a perimeter edge of bottom lid 27.

Top lid 26 and bottom lid 27 may allow for disposed refuse to be contained within main receptacle 21. Thereby preventing said disposed refuse from spilling out of main receptacle 21 via the first end and second end. Main receptacle 21 may include externally mounted compartments 29. Compartments 29 may be configured to receive tools commonly associated with gardening or trash clean up. The main receptacle 21 may also include a handle 23 protruding from a bottom edge of the first end. It may be preferable for handle 23 to include a squared portion to help stabilize main receptacle 21 when it is placed horizontally. The handle 23 may also help give the user a gripping point to lift receptacle 21 upward from a horizontal position. Located opposite the handle 23 may be main receptacle wheels 22. The main receptacle wheels 22 may be mounted on opposing sides about the second end of main receptacle 21. When in a horizontal position, it may be preferable for the main receptacle wheels 22 and handle 23 to help create a stable base for main receptacle 21. When the main receptacle 21 is placed in a vertical position, the main receptacle stand 25 in conjunction with main receptacle wheels 22 may help act like a base. Thereby helping stabilize the main receptacle 21 in said vertical position.

Best illustrated in FIG. 1-2 main receptacle assembly 20 may include a centrally located seat assembly 60. The seat assembly 60 may include a hingedly mounted back rest 64. The back rest 64 may include an open position and a closed position. While in the closed position an exterior of the back rest 64 may form a portion of the cylindrical body of the main receptacle 21. The back rest 64 may be placed into an open position exposing a seat 62. The seat 62 may be a flat portion of main receptacle 21 that is configured for a user to sit on. It may be preferable for seat assembly 60 to be mounted opposite the handle 23 and main receptacle wheels 22 of main receptacle assembly 20.

Figure 4:
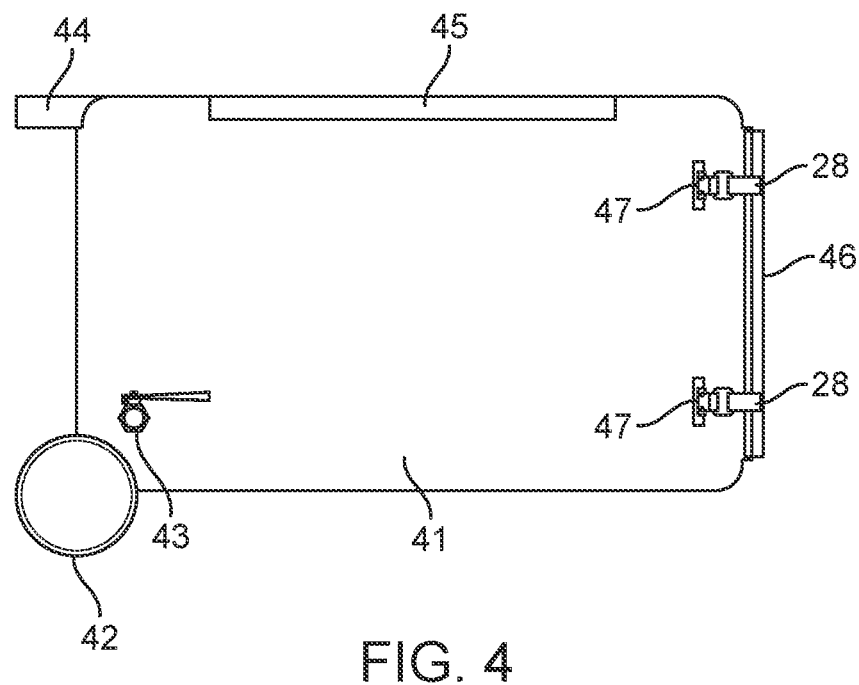
FIG. 4 is a representation of add-on receptacle 41 disengaged from the main receptacle assembly 20 and add-on lid 46 mounted thereon.

Referring now to FIGS. 1 and 4 it may be suitable for bottom lid 27 of main receptacle assembly 20 to be removable and replaced with add-on receptacle assembly 40. The add-on receptacle assembly 40 may include an add-on receptacle 41. The add-on receptacle 41 may be a hollow cylindrical body with a flat end including an opening. Located about the exterior perimeter of the opening may be a plurality of add-on latch hook 47.

Demonstrated in FIG. 1, the main receptacle assembly 20 may engage with add-on latch hook 47 via bottom lid latch 28. The engagement of main receptacle assembly 20 to add-on receptacle assembly 40 may form a continuation of the hollow cylindrical body of main receptacle 21 into the body of the add-on receptacle 41. It may be preferable for a door 45 to be hingedly mounted at a top portion of add-on receptacle 41. The door 45 may provide the user access to the interior of the add-on receptacle 41. The interior of add-on receptacle 41 adapted to store refuse therein. The add-on receptacle 41 may also include an externally mounted water spigot 43. The water spigot 43 may be a straight valve, or any variation thereof, for the expulsion of accumulated water within add-on receptacle 41. Mounted to a bottom edge, opposite to the opening of main receptacle 41 may be add-on wheels 42. The add-on wheels 42 may help with the maneuverability of the present invention 10 while in a horizontal configuration.

Figure 3:
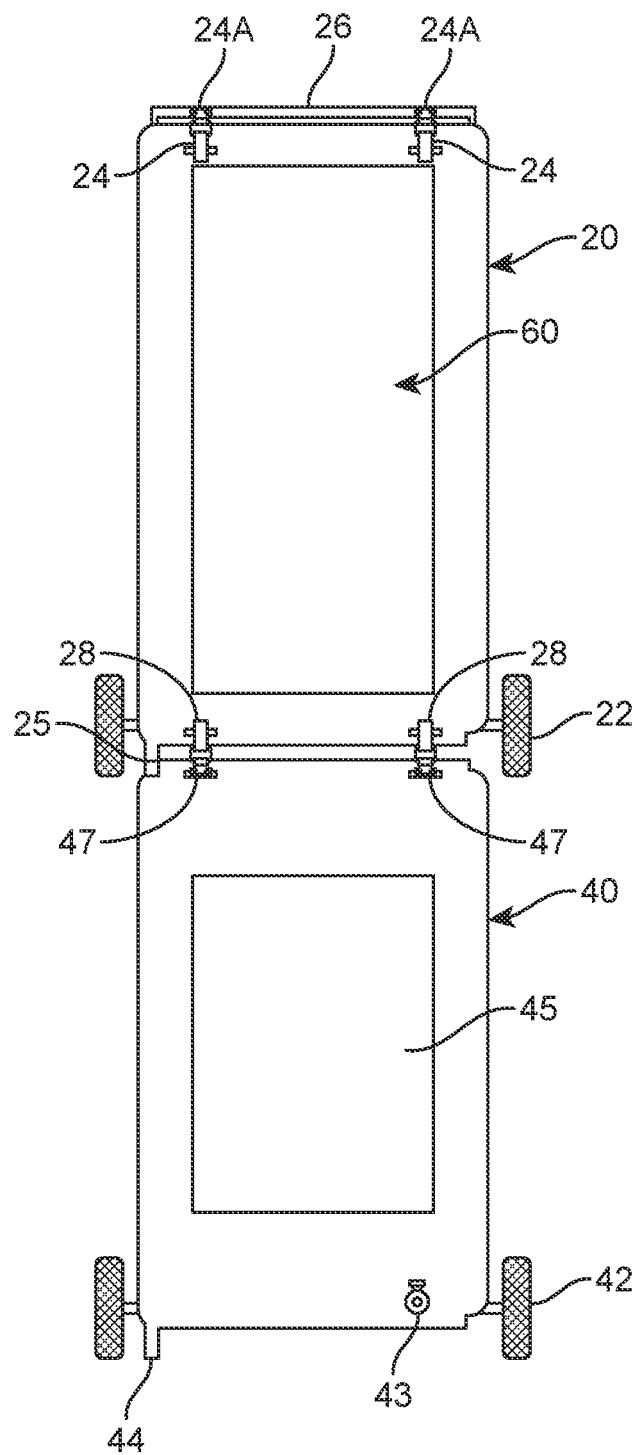
FIG. 3 illustrates main receptacle assembly 20 engaged with the add-on receptacle assembly 40 in a vertically stacked configuration.

Shown in FIG. 4 it may be suitable for add-on receptacle 41 to be disengaged from main receptable assembly 20. The add-on receptacle 41 may include an add-on lid 46. The add-on lid 46 may cover the opening of add-on receptacle 41. The add-on lid 46 may include a threaded portion that is received by the interior perimeter of the add-on receptacle 41 opening. Said add-on receptacle 41 may also include an add-on stand 44. The add-on stand 44 may help stabilize add-on receptacle 41 while it is placed in a vertical position. Referring now to FIG. 3 it may be suitable for main receptacle assembly 20 and add-on receptacle 40 to include a vertical configuration when engaged with one another. Wherein the vertical configuration is maintained upright via a balanced base formed by the add-on wheels 42 and add-on stand 44.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wheeled garbage receptacle with a built-in seat, comprising:
   a) a main receptacle assembly including a main receptacle with a hollow interior, said main receptacle having opposing open ends, said opposing ends including a first end and a second end; and
   b) an add-on receptacle assembly including an add-on receptacle, wherein said add-on receptacle includes an add-on open end and an add-on closed end, the add-on open end being located in alignment with said second end of the main receptacle assembly, said add-on receptacle including a door to access an add-on interior; and
   c) a seat assembly including the built-in seat and a back rest, wherein said built-in seat and back rest are mounted to an exterior of the main receptacle, the back rest being hingedly mounted to said exterior.

2. The wheeled garbage receptacle with the built-in seat of claim 1 wherein said main receptacle includes compartments mounted to an exterior.

3. The wheeled garbage receptacle with the built-in seat of claim 1 wherein said main receptacle includes main receptacle wheels externally mounted to a bottom edge of the second end.

4. The wheeled garbage receptacle with the built-in seat of claim 1 wherein said main receptacle includes a main receptacle stand protruding from a top edge of the second end.

5. The wheeled garbage receptacle with the built-in seat of claim 1 wherein said main receptacle includes a handle protruding from an edge of the first end.

6. The wheeled garbage receptacle with the built-in seat of claim 1 wherein said main receptacle includes a plurality of bottom lid latches about a perimeter of the second end.

7. The wheeled garbage receptacle with the built-in seat of claim 6 wherein said bottom lid latches engage with the add-on receptacle via add-on latch hooks.

8. The wheeled garbage receptacle with the built-in seat of claim 6 wherein said bottom lid latches engage with a bottom lid via bottom lid latch hooks.

9. The wheeled garbage receptacle with the built-in seat of claim 1 wherein said main receptacle includes a plurality of top lid latches about a perimeter of the first end that engage with a top lid.

10. The wheeled garbage receptacle with the built-in seat of claim 1 wherein said add-on receptacle includes an externally mounted water spigot.

11. The wheeled garbage receptacle with the built-in seat of claim 1 wherein said add-on closed end includes externally mounted add-on receptacle wheels and an add-on stand.

12. The wheeled garbage receptacle with the built-in seat of claim 1 wherein said add-on open end receives an add-on lid that includes a threaded portion.

13. The wheeled garbage receptacle with the built-in seat of claim 6 wherein said main receptacle assembly and add-on receptacle assembly includes a vertical configuration.

14. A wheeled garbage receptacle with a built-in seat, comprising:
   a) a main receptacle assembly including a main receptacle with a hollow interior, said main receptacle having a cylindrical body with opposing open ends, said opposing ends including a first end and a second end; and
   b) an add-on receptacle assembly including an add-on receptacle, wherein said add-on receptacle includes a cylindrical body with an add-on open end and an add-on closed end, the add-on open end being located in alignment with said second end of the main receptacle assembly, said add-on receptacle including a door to access an add-on interior; and
   c) a seat assembly including the built-in seat and a back rest, wherein said built-in seat and back rest are mounted to an exterior of the main receptacle, the back rest being hingedly mounted to said exterior, said back rest having a hemisphere shape including an open position and closed position, wherein the back rest is flush with the cylindrical body of the main receptacle while in the closed position.

15. A wheeled garbage receptacle with a built-in seat, consisting of:
- a) a main receptacle assembly including a main receptacle with a hollow interior, said main receptacle having a cylindrical body with opposing open ends, said opposing ends including a first end and a second end, the main receptacle having compartments mounted to an exterior of said cylindrical body, said main receptacle including main receptacle wheels externally mounted to a bottom edge of the second end, the main receptacle including a main receptacle stand protruding from a top edge of the second end to facilitate standing the main receptacle vertically, the main receptacle having a handle protruding from an edge of the first end, said main receptacle including a plurality of bottom lid latches about a perimeter of the second end, the main receptacle having top lid latches about a perimeter of the first end that engage with a top lid; and
- b) an add-on receptacle assembly including an add-on receptacle, wherein said add-on receptacle includes a cylindrical body with an add-on open end and an add-on closed end, the add-on open end being located in alignment with said second end of the main receptacle assembly, the add-on open end including add-on latch hooks externally mounted about the perimeter of said add-on open end, said add-on latch hooks engaging with the plurality of bottom lid latches of the main receptacle assembly, said add-on receptacle including a door to access an add-on interior, the add-on receptacle including an externally mounted water spigot in the form of a straight valve, said add-on closed end including externally mounted add-on receptacle wheels and an add-on stand; and
- c) a seat assembly including the built-in seat and a back rest, wherein said built-in seat and back rest are mounted to an exterior of the main receptacle, the back rest being hingedly mounted to said exterior, said back rest having a hemisphere shape including an open position and closed position, wherein the back rest is flush with the cylindrical body of the main receptacle while in the closed position.

\* \* \* \* \*